United States Patent
Masukake et al.

(10) Patent No.: US 10,920,693 B2
(45) Date of Patent: Feb. 16, 2021

(54) CYLINDER DEACTIVATION CHANGE APPARATUS

(71) Applicant: Honda Motor Co., Ltd., Tokyo (JP)

(72) Inventors: Yuichi Masukake, Wako (JP); Daisuke Shiomi, Wako (JP); Chiho Chinda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/578,117

(22) Filed: Sep. 20, 2019

(65) Prior Publication Data

US 2020/0102898 A1  Apr. 2, 2020

(30) Foreign Application Priority Data

Sep. 28, 2018  (JP) ................................ 2018-183179

(51) Int. Cl.
*F02D 41/00* (2006.01)
*F02P 5/04* (2006.01)
(Continued)

(52) U.S. Cl.
CPC .......... *F02D 41/005* (2013.01); *F02B 17/005* (2013.01); *F02D 17/02* (2013.01);
(Continued)

(58) Field of Classification Search
CPC ...... F02D 41/00; F02D 41/005; F02D 41/006; F02D 41/30; F02D 41/3064; F02D 17/02; F02P 5/04; F02P 5/045; F02P 5/15; F02P 5/1504; F02P 5/1516; F02P 5/00; F02B 17/005
(Continued)

(56) References Cited

U.S. PATENT DOCUMENTS

2004/0237514 A1* 12/2004 Surnilla ................. F02D 41/08
60/299
2004/0237935 A1* 12/2004 Fukusako ........... F02D 41/0087
123/406.47
(Continued)

FOREIGN PATENT DOCUMENTS

| JP | H08105337 A | 4/1996 |
| JP | 2004346875 A | 12/2004 |
| JP | 2011012610 A | 1/2011 |

*Primary Examiner* — John Kwon
*Assistant Examiner* — Johnny H Hoang
(74) *Attorney, Agent, or Firm* — Duft & Bornsen, PC

(57) ABSTRACT

A cylinder deactivation change apparatus including fuel supply parts supplying fuel into a first and second combustion chambers of a first and second cylinders, ignition parts igniting fuel-air mixture in the first and the second combustion chambers and a microprocessor. The microprocessor is configured to perform determining whether changing the operation mode is necessary, and controlling the fuel supply parts and ignition parts so as to ignite at first ignition timing before it is determined that changing the operation mode to the first mode is necessary, and so as to ignite at second ignition timing retarded in comparison with the first ignition timing and so as to supply the fuel into the first combustion chamber in a manner that causes a stratified charge combustion in the first combustion chamber, when it is determined that changing the operation mode to the first mode is necessary.

18 Claims, 5 Drawing Sheets

(51) Int. Cl.
*F02D 41/30* (2006.01)
*F02B 17/00* (2006.01)
*F02P 5/15* (2006.01)
*F02D 17/02* (2006.01)

(52) U.S. Cl.
CPC ....... *F02D 41/006* (2013.01); *F02D 41/3064* (2013.01); *F02P 5/045* (2013.01); *F02P 5/1504* (2013.01); *F02P 5/1516* (2013.01)

(58) Field of Classification Search
USPC ............. 701/101–105; 123/295–301, 198 D, 123/198 DB, 198 DC, 198 F
See application file for complete search history.

(56) References Cited

U.S. PATENT DOCUMENTS

| | | | |
|---|---|---|---|
| 2005/0193721 A1* | 9/2005 | Surnilla | F01N 13/011 60/285 |
| 2005/0193988 A1* | 9/2005 | Bidner | F02D 13/06 123/481 |
| 2014/0014062 A1* | 1/2014 | Yacoub | F02B 17/005 123/295 |
| 2016/0108824 A1* | 4/2016 | Matsushima | F02P 5/045 123/344 |
| 2017/0254278 A1* | 9/2017 | Ohisa | F02D 37/02 |
| 2017/0284313 A1* | 10/2017 | Shewell | F01L 1/2416 |

* cited by examiner

CYLINDER DEACTIVATION CHANGE APPARATUS

CROSS-REFERENCE TO RELATED APPLICATION

This application is based upon and claims the benefit of priority from Japanese Patent Application No. 2018-183179 filed on Sep. 28, 2018, the content of which is incorporated herein by reference.

BACKGROUND OF THE INVENTION

Field of the Invention

This invention relates to a cylinder deactivation change apparatus configured to change an operation mode between a mode in which part of multiple cylinders of an internal combustion engine is deactivated and a mode in which the deactivated cylinder is reactivated.

Description of the Related Art

As this type of apparatuses, there are known apparatuses that are configured to be able to change the operation mode between a deactivated-cylinder operation mode in which some of multiple cylinders are deactivated, and an all-cylinder operation mode in which all cylinders are activated. Such an apparatus is described in, for example, Japanese Unexamined Patent Publication No. H08-105337 (JPH08-105337A). The apparatus of JPH08-105337A is configured to, when changing the operation mode from the deactivated-cylinder operation mode to the all-cylinder operation mode, reduce a shock caused by a torque variation by sequentially starting to supply fuel to cylinders that have started to introduce intake air while making a time difference and retarding the ignition timing compared to the fuel supply start timing.

However, since the apparatus of JPH08-105337A retards the ignition timing when changing the operation mode, misfire may be caused due to destabilization of combustion state.

SUMMARY OF THE INVENTION

An aspect of the present invention is a cylinder deactivation change apparatus, configured to change an operation mode of an internal combustion engine including a first cylinder and a second cylinder, between a first mode in which the first cylinder and the second cylinder are activated and a second mode in which the second cylinder is deactivated while the first cylinder is activated. The cylinder deactivation change apparatus includes: fuel supply parts configured to supply a fuel into a first combustion chamber formed in the first cylinder and a second combustion chamber formed in the second cylinder; ignition parts configured to ignite a fuel-air mixture in the first combustion chamber and a fuel-air mixture in the second combustion chamber; and an electronic control unit having a microprocessor and a memory. The microprocessor is configured to perform: determining whether it is necessary to change the operation mode; and controlling the fuel supply parts and the ignition parts in accordance with a result in the determining. The microprocessor is further configured to perform the controlling including controlling the ignition parts so as to ignite at a first ignition timing before it is determined that it is necessary to change the operation mode to the first mode in the determining during being operated in the second mode, and controlling the ignition parts so as to ignite at a second ignition timing retarded in comparison with the first ignition timing and controlling the fuel supply parts so as to supply the fuel into the first combustion chamber in a manner that causes a stratified charge combustion in the first combustion chamber, when it is determined that it is necessary to change the operation mode to the first mode in the determining.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention will be described with reference to FIGS. 1 to 5B. A cylinder deactivation change apparatus according to an embodiment of the present invention is applied to a spark-ignition internal-combustion engine capable of changing the operation mode between a deactivated-cylinder operation mode, in which some of multiple cylinders are deactivated by stopping supply of fuel to the some cylinders and an all-cylinder operation mode, in which all cylinders are activated. The engine is, for example, V-6 engine, in which multiple cylinders are disposed in a V-shape in a side view and a pair of front and rear banks are formed, and four-cycle engine, in which four strokes consisting of intake, compression, combustion, and exhaust are performed in one operation cycle.

Figure 1:
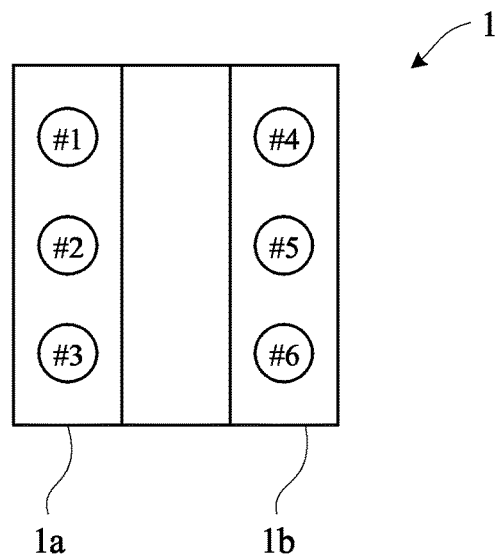
FIG. 1 is a diagram showing positions of multiple cylinders of an engine to which a cylinder deactivation change apparatus according to an embodiment of the present invention is applied.

FIG. 1 is a diagram showing the positions of multiple (six) cylinders #1 to #6 of an engine 1. For example, during low-load operation, the engine 1 is operated in a deactivated-cylinder operation mode in which three cylinders #1 to #3 on one bank are activated and three cylinders #4 to #6 on the other bank 1b are deactivated; during high-load operation, it is operated in an all-cylinder operation mode in which all the six cylinders #1 to #6 are activated. Hereafter, the cylinders #4 to #6, which are deactivated during operation in the deactivated-cylinder operation mode, may be referred to as the "deactivated cylinders," and the cylinders #1 to #3, which are not deactivated, may be referred to as the "non-deactivated cylinders." The deactivated cylinders #4 to #6 have the same configuration, and the non-deactivated cylinders #1 to #3 also have the same configuration.

Figure 2:
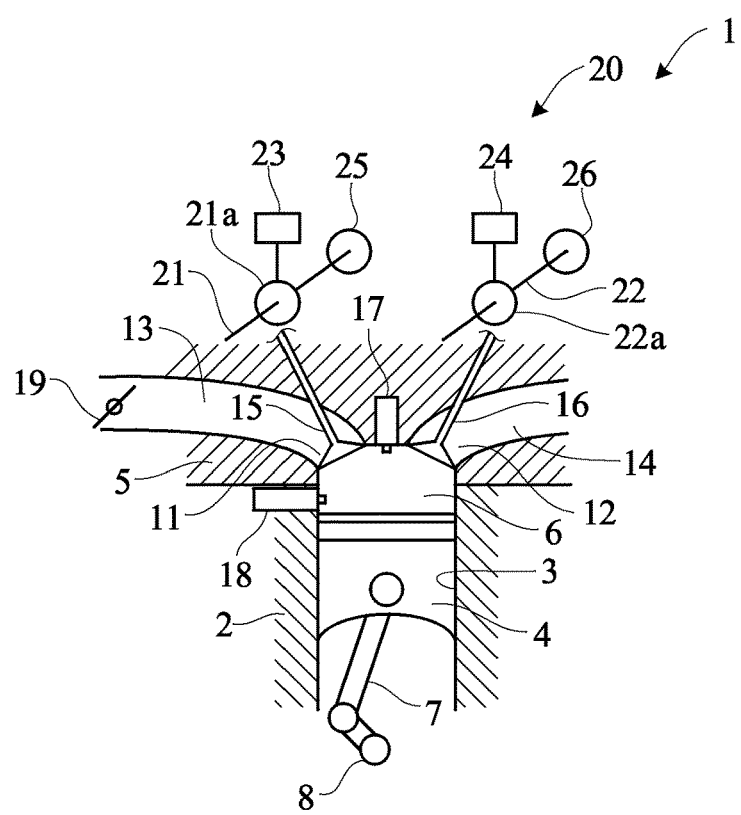
FIG. 2 is a diagram schematically showing a major-part configuration of an engine to which a cylinder deactivation change apparatus according to an embodiment of the present invention is applied.

FIG. 2 is a diagram schematically showing a major-part configuration of the engine 1, to which the cylinder deactivation change apparatus according to the present embodiment is applied. FIG. 2 shows the configuration of one of the deactivated cylinders #4 to #6. As shown in FIG. 2, the engine 1 includes a cylinder 3 (one of cylinders #4 to #6) formed in a cylinder block 2, a piston 4 slidably disposed inside the cylinder 3, and a combustion chamber 6 formed between the piston 4 and a cylinder head 5. The piston 4 is coupled to a crankshaft 8 through a connecting rod 7. The crankshaft 8 rotates by reciprocation of the piston 4 along the inner wall of the cylinder 3.

The cylinder head 5 is provided with an intake port 11 and an exhaust port 12. An intake passage 13 communicates with the combustion chamber 6 through the intake port 11, and an exhaust passage 14 communicates with the combustion chamber 6 through the exhaust port 12. The intake port 11 is opened and closed by an intake valve 15, and the exhaust port 12 is opened and closed by an exhaust valve 16. A throttle valve 19 is disposed upstream of the intake valve 15 on the intake passage 13. The throttle valve 19 is, for example, a butterfly valve and is used to control the amount of intake air flowing into the combustion chamber 6. The intake valve 15 and exhaust valve 16 are open/close driven by a valve mechanism 20.

A spark plug 17 and a direct-injection injector 18 are mounted on the cylinder head 5 and cylinder block 2, respectively, so as to face the combustion chamber 6. The spark plug 17 is disposed between the intake port 11 and exhaust port 12 and generates a spark by electrical energy to ignite a mixture of the fuel and air in the combustion chamber 6. The injector 18 is disposed near the intake valve 15 and driven by electrical energy to inject the fuel into the combustion chamber 6 obliquely downward. The injector 18 need not be disposed near the intake valve 15 and may be disposed near the spark plug 17.

The valve mechanism 20 includes an intake camshaft 21 and an exhaust camshaft 22. The intake camshaft 21 is integrally provided with an intake cam 21a corresponding to each cylinder (cylinder 3), and the exhaust camshaft 22 is integrally provided with an exhaust cam 22a corresponding to each cylinder. The intake camshaft 21 and exhaust camshaft 22 are coupled to the crankshaft 8 through a timing belt (not shown) so as to rotate once each time the crankshaft 8 rotates twice. The intake valve 15 is opened and closed by rotation of the intake camshaft 21 through an intake rocker arm (not shown) at a predetermined timing corresponding to the profile of the intake cam 21a. The exhaust valve 16 is opened and closed by rotation of the exhaust camshaft 22 through an exhaust rocker arm (not shown) at a predetermined timing corresponding to the profile of the exhaust cam 22a.

The valve mechanism 20 further includes cylinder deactivation mechanisms 23 and 24 that keep the intake valve 15 and exhaust valve 16 closed and cam-phase change mechanisms 25 and 26 that change the phases of the intake cam 21a and exhaust cam 22a relative to the crankshaft 8 (cam phases).

The cylinder deactivation mechanisms 23 and 24 have the same configuration, and the cylinder deactivation mechanism 23 for intake will be described as a representative. Although not shown in detail, the cylinder deactivation mechanism 23 includes first and second rocker arms for intake that are axially arranged along the intake camshaft 21 and a coupling pin that integrally couples the first and second rocker arms to each other.

The coupling pin can be moved between a coupling position in which the first and second rocker arms are coupled together and a non-coupling position in which the coupling is released. The first rocker arm is driven by the intake cam 21a, and the intake valve 15 is driven by the second rocker arm. Thus, when the coupling pin is moved to the coupling position, rotation of the intake cam 21a is transmitted to the intake valve 15 through the first and second rocker arms so as to open/close the intake valve 15. On the other hand, when the coupling pin is moved to the non-coupling position, rotation of the intake cam 21a is not transmitted to the intake valve 15 so that the intake valve 15 is kept closed.

The coupling pins of the cylinder deactivation mechanisms 23 and 24 are moved, for example, by hydraulic pressure from a hydraulic pump that operates by driving a control valve. Specifically, in the deactivated-cylinder operation mode, the coupling pins of the cylinder deactivation mechanisms 23 and 24 are moved to the non-coupling positions, and both the intake valve 15 and exhaust valve 16 are closed. On the other hand, in the all-cylinder operation mode, the coupling pins of the cylinder deactivation mechanisms 23 and 24 are moved to the coupling positions, and the intake valve 15 and exhaust valve 16 are opened and closed.

The cam-phase change mechanisms 25 and 26 are disposed on ends of the intake camshaft 21 and exhaust camshaft 22, respectively. The cam-phase change mechanisms 25 and 26 have the same configuration, and the cam-phase change mechanism 26 for exhaust will be described as a representative. Although not shown in detail, the cam-phase change mechanism 26 includes a rotatable, cylindrical housing that rotatably houses the exhaust camshaft 22 and includes an advance chamber and a retard chamber. A timing belt wound around the crankshaft 8 is wound around the outer peripheral surface of the housing.

For example, hydraulic pressure from a hydraulic pump that operates by driving a control valve is supplied to the advance chamber and retard chamber. By controlling the driving of the control valve, the cam phase of the exhaust cam 22a can be continuously changed to the advance side or retard side. Thus, the opening/closing timing of the exhaust valve 16 can be changed. That is, when hydraulic pressure is supplied to the advance chamber, the exhaust camshaft 22 rotates relative to the housing in one direction, and the opening/closing timing of the exhaust valve 16 is changed to the advance side. On the other hand, when hydraulic pressure is supplied to the retard chamber, the exhaust camshaft 22 rotates relative to the housing in the opposite direction, and the opening/closing timing of the exhaust valve 16 is changed to the retard side.

Although not shown, the non-deactivated cylinders #1 to #3 have a configuration similar to the deactivated cylinders #4 to (FIG. 2) except for a part of the valve mechanism 20. That is, the non-deactivated cylinders #1 to #3 are not deactivated and therefore do not include the cylinder deactivation mechanisms 23 and 24. Also, the cam-phase change mechanisms 25 and 26 of the non-deactivated cylinders #1 to #3 operate so as to control the amount of exhaust gas that is a part of the exhaust gas, which is the burned gas, and that is recirculated into the combustion chamber 6, that is, the amount of internal EGR gas. By changing the opening/closing timings of the intake valve 15 and exhaust valve 16 using the cam-phase change mechanisms 25 and 26, the valve overlap amount, in which the opening periods of the intake valve 15 and exhaust valve 16 overlap each other, is changed and thus the amount of internal EGR gas is controlled.

Specifically, the cam-phase change mechanisms 25 and 26 of the non-deactivated cylinders #1 to #3 are operated so as to increase the amount of internal EGR gas in the deactivated-cylinder operation mode and to reduce the amount of internal EGR gas in the all-cylinder operation mode. Increasing the amount of internal EGR gas in the deactivated-cylinder operation mode allows for a reduction in nitride oxide (NOx) being exhausted and thus an increase in exhaust gas purification performance, a reduction in pumping loss and thus an improvement in fuel efficiency, and the like.

Such a configuration increases the degree of opening of the throttle valve 19 in the deactivated-cylinder operation mode compared to that in the all-cylinder operation mode, allowing for a reduction in pumping loss and thus an improvement in fuel efficiency. On the other hand, when changing the operation mode from the deactivated-cylinder operation mode to the all-cylinder operation mode, the degree of opening of the throttle valve 19 is controlled in accordance with the mode change, and the deactivated cylinders #4 to #6 are reactivated by supplying the fuel to the combustion chambers 6 of the deactivated cylinders #4 to #6. For this reason, even if the torque required by the engine 1 is constant, the actual torque may be increased and thus the occupant may be shocked by the torque variation. To address this problem, the ignition timing of the spark plug 17 is shifted to the retard side (retarded). This allows for a reduction in the actual torque and thus a reduction in the shock.

However, retarding the ignition timing when changing the operation mode from the deactivated-cylinder operation mode to the all-cylinder operation mode may destabilize the combustion and thus cause a misfire. In particular, increasing the amount of internal EGR gas in the deactivated-cylinder operation mode may further destabilize the combustion and more easily cause a misfire. In view of the foregoing, the cylinder deactivation change apparatus according to the present embodiment is configured as follows.

Figure 3:
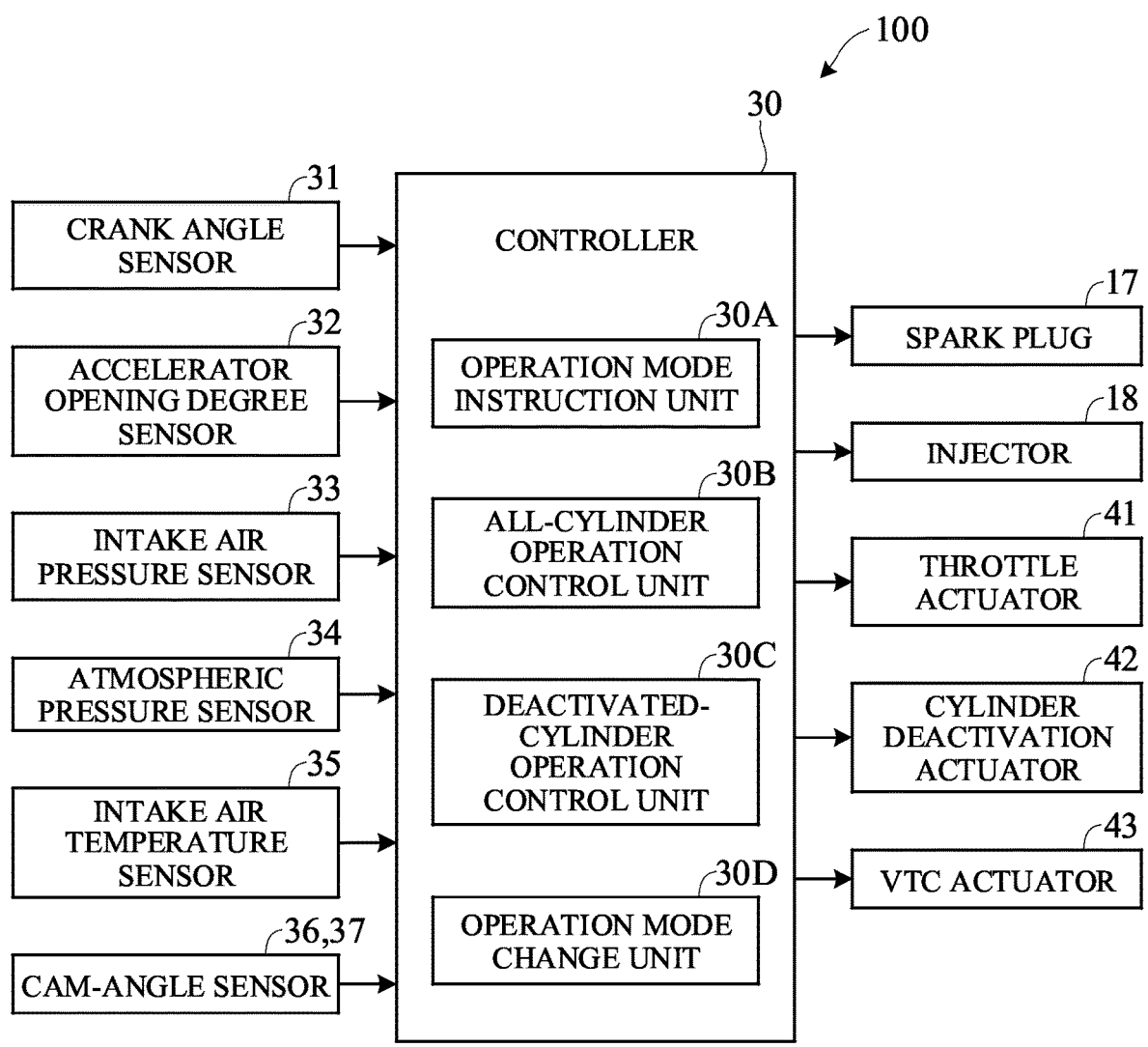
FIG. 3 is a block diagram showing a major-part configuration of a cylinder deactivation change apparatus according to an embodiment of the present invention.

FIG. 3 is a block diagram showing a major-part configuration of a cylinder deactivation change apparatus 100 according to the embodiment of the present invention. As shown in FIG. 3, the cylinder deactivation change apparatus 100 is configured centered on a controller 30 for engine control and includes sensors, actuators, and the like that are communicatively connected to the controller 30.

Specifically, a crank angle sensor 31, an accelerator opening degree sensor 32, an intake air pressure sensor 33, an atmospheric pressure sensor 34, an intake air temperature sensor 35, cam-angle sensors 36 and 37, the spark plug 17, the injector 18, a throttle actuator 41, a cylinder deactivation actuator 42, and a VTC actuator 43 are connected to the controller 30.

The crank angle sensor 31 is disposed on the crankshaft 8 and is configured to output a pulse signal in response to rotation of the crankshaft 8. The controller 30 calculates the engine speed on the basis of the pulse signal from the crank angle sensor 31, as well as identifies the time point at which the pistons 4 of the cylinders #1 to #6 are located in predetermined crank angle positions near the top dead center (TDC) when starting the intake stroke.

The accelerator opening degree sensor 32 is disposed on an accelerator pedal (not shown) of the vehicle and detects the manipulated variable of the accelerator pedal (accelerator opening degree). The intake air pressure sensor 33 is disposed downstream of the throttle valve 19 on the intake passage 13 and detects the intake air pressure. The atmospheric pressure sensor 34 is disposed upstream of the throttle valve 19 on the intake passage 13 and detects the atmospheric pressure. The intake air temperature sensor 35 is disposed on the intake passage 13 and detects the intake air temperature.

The cam-angle sensors 36 and 37 are disposed on ends of the intake camshaft 21 and exhaust camshaft 22, respectively, and configured to output pulse signals in response to rotation of the intake camshaft 21 and exhaust camshaft 22. The controller 30 calculates the cam phase of the intake cam 21a on the basis of the signals from the crank angle sensor 31 and cam-angle sensor 36 and also calculates the cam phase of the exhaust cam 22a on the basis of the signals from the crank angle sensor 31 and cam-angle sensor 37.

Although not shown, a throttle sensor that detects the throttle opening degree, an air-flow meter that detects the amount of intake air, a knock sensor that detects the occurrence state of knocking, an $O_2$ sensor that detects the oxygen concentration of the exhaust gas, a water temperature sensor that detects the temperature of engine cooling water, and the like are also connected to the controller 30.

The throttle actuator 41 is a stepping motor or the like and drives the throttle valve 19 (the rotation shaft of a butterfly valve). The cylinder deactivation actuator 42 is, for example, a control valve that controls the flow of pressure oil for moving the coupling pins of the cylinder deactivation mechanisms 23 and 24, and changes the operation mode of the cylinder deactivation mechanisms 23 and 24 between the deactivated-cylinder operation mode and all-cylinder operation mode. The VTC actuator 43 is, for example, a control valve that controls the flow of pressure oil to the advance chamber and retard chamber of the cam-phase change mechanisms 25 and 26, and changes the opening/closing timings of the intake valve 15 and exhaust valve 16.

The controller 30 is an electronic control unit (ECU) and includes a computer including an arithmetic unit, such as a CPU, a memory, such as a ROM or RAM, and other peripheral circuits. The controller 30 includes, as functional configurations, an operation mode instruction unit 30A, an all-cylinder operation control unit 30B, a deactivated-cylinder operation control unit 30C, and an operation mode change unit 30D.

The operation mode instruction unit 30A outputs an instruction for a change of the operation mode to the all-cylinder operation mode or deactivated-cylinder operation mode on the basis of the operation states of the engine 1, such as the engine speed detected by the crank angle sensor 31 and the accelerator opening degree detected by the accelerator opening degree sensor 32. For example, when the accelerator opening degree becomes equal to or smaller than a predetermined value and the engine speed becomes equal to or smaller than a predetermined value in the all-cylinder operation mode, the operation mode instruction unit 30A outputs an instruction for a change to the deactivated-cylinder operation mode. On the other hand, when the accelerator opening degree becomes greater than the predetermined value and the engine speed becomes greater than the predetermined value in the deactivated-cylinder operation mode, the operation mode instruction unit 30A outputs an instruction for a change to the all-cylinder operation mode. In other words, the operation mode instruction unit 30A determines whether the operation mode needs to be changed to the all-cylinder operation mode or the deactivated-cylinder operation mode, on the basis of the driving states of the engine 1, and outputs an instruction for a change of the operation mode in accordance with a result of the determination.

If the operation mode instruction unit 30A outputs an instruction for a change to the all-cylinder operation mode, the all-cylinder operation control unit 30B controls the spark plugs 17, injectors 18, and actuators 41 to 43 so that the engine 1 is driven in the all-cylinder operation mode (all-cylinder operation control). Specifically, the all-cylinder operation control unit 30B controls the cylinder deactivation actuator 42 so that the intake valves 15 and exhaust valves 16 of all the cylinders #1 to #6 are opened and closed by rotation of the crankshaft 8, as well as controls the VTC actuators 43 so that the intake valves 15 and exhaust valves 16 are opened and closed at a timing corresponding to the operation states determined by the engine speed, accelerator opening degree, and the like. At this time, the valve overlap amount in which the opening periods of the intake valve 15 and exhaust valve 16 overlap each other becomes a value corresponding to the operation states. Hereafter, this valve overlap amount is referred to as the "reference overlap amount" for convenience.

The all-cylinder operation control unit 30B also calculates the target opening degree of the throttle valves 19 on the basis of the accelerator opening degree and the like and controls the throttle actuator 41 so that the throttle opening degree becomes the target opening degree. The all-cylinder operation control unit 30B further calculates the target injection amount of the fuel on the basis of signals from the intake air pressure sensor 33, atmospheric pressure sensor 34, intake air temperature sensor 35, and the like so that the air-fuel ratio of the air-fuel mixture in the combustion chambers 6 of the cylinders #1 to #6 becomes the target air-fuel ratio (e.g., theoretical air-fuel ratio), and controls the injectors 18 so that the fuel in an amount corresponding to the target injection amount is injected at a predetermined timing. For example, the all-cylinder operation control unit 30B controls the injectors 18 of the cylinders #1 to #6 so that the injectors 18 inject the fuel twice in the intake stroke (injection of two stages in intake). The all-cylinder operation control unit 30B also controls the spark plugs 17 of the cylinders #1 to #6 so that the ignition timing of the spark plugs 17 becomes the optimum ignition timing determined on the basis of the signals from the intake air pressure sensor 33 and the like. Hereafter, this ignition timing is referred to as the "all-cylinder reference ignition timing" for convenience.

If the operation mode instruction unit 30A outputs an instruction for a change to the deactivated-cylinder operation mode, the deactivated-cylinder operation control unit 30C controls the spark plugs 17, injectors 18, and actuators 41 to 43 so that the engine 1 is driven in the deactivated-cylinder operation mode (deactivated-cylinder operation control). Specifically, the deactivated-cylinder operation control unit 30C controls the cylinder deactivation actuator 42 so that the intake valves 15 and exhaust valves 16 of the deactivated cylinders #4 to #6 are kept closed. The deactivated-cylinder operation control unit 30C also controls the VTC actuators 43 of the non-deactivated cylinders #1 to #3 so that the valve overlap amounts of the non-deactivated cylinders #1 to #3 become greater than the reference overlap amount in the all-cylinder operation mode. Thus, the amounts of internal EGR gas are increased compared to those in the all-cylinder operation mode, allowing for an improvement in the fuel efficiency, and the like.

The deactivated-cylinder operation control unit 30C also calculates the target opening degree of the throttle valves 19 on the basis of the accelerator opening degree and the like and controls the throttle actuator 41 so that the throttle opening degree becomes the target opening degree. At this time, if the torque required by the engine 1 is equal between the deactivated-cylinder operation mode and all-cylinder operation mode, the throttle opening degree in the deactivated-cylinder operation mode becomes greater than that in the all-cylinder operation mode, resulting in a reduction in pumping loss. Also, as in the all-cylinder operation mode, the deactivated-cylinder operation control unit 30C controls the injectors 18 of the non-deactivated cylinders #1 to #3 so that the fuel in an amount corresponding to the target injection amount is injected at predetermined timings (two stages in intake), as well as controls the spark plugs 17 of the cylinders #1 to #6 so that the ignition timings of the spark plugs 17 become an ignition timing suitable for the deactivated-cylinder operation mode. Hereafter, this ignition timing is referred to as the "deactivated-cylinder reference ignition timing" for convenience.

When the operation mode instruction unit 30A outputs an instruction for a change to the deactivated-cylinder operation mode during operation in the all-cylinder operation mode, the operation mode change unit 30D changes the operation mode from the all-cylinder operation mode to the deactivated-cylinder operation mode. Also, when the operation mode instruction unit 30A outputs an instruction for a change to the all-cylinder operation mode during operation in the deactivated-cylinder operation mode, the operation mode change unit 30D changes the operation mode from the deactivated-cylinder operation mode to the all-cylinder operation mode. That is, the operation mode change unit 30D performs a mode change process for changing from the all-cylinder operation mode to the deactivated-cylinder operation mode and a mode change process for changing from the deactivated-cylinder operation mode to the all-cylinder operation mode.

Figure 4:
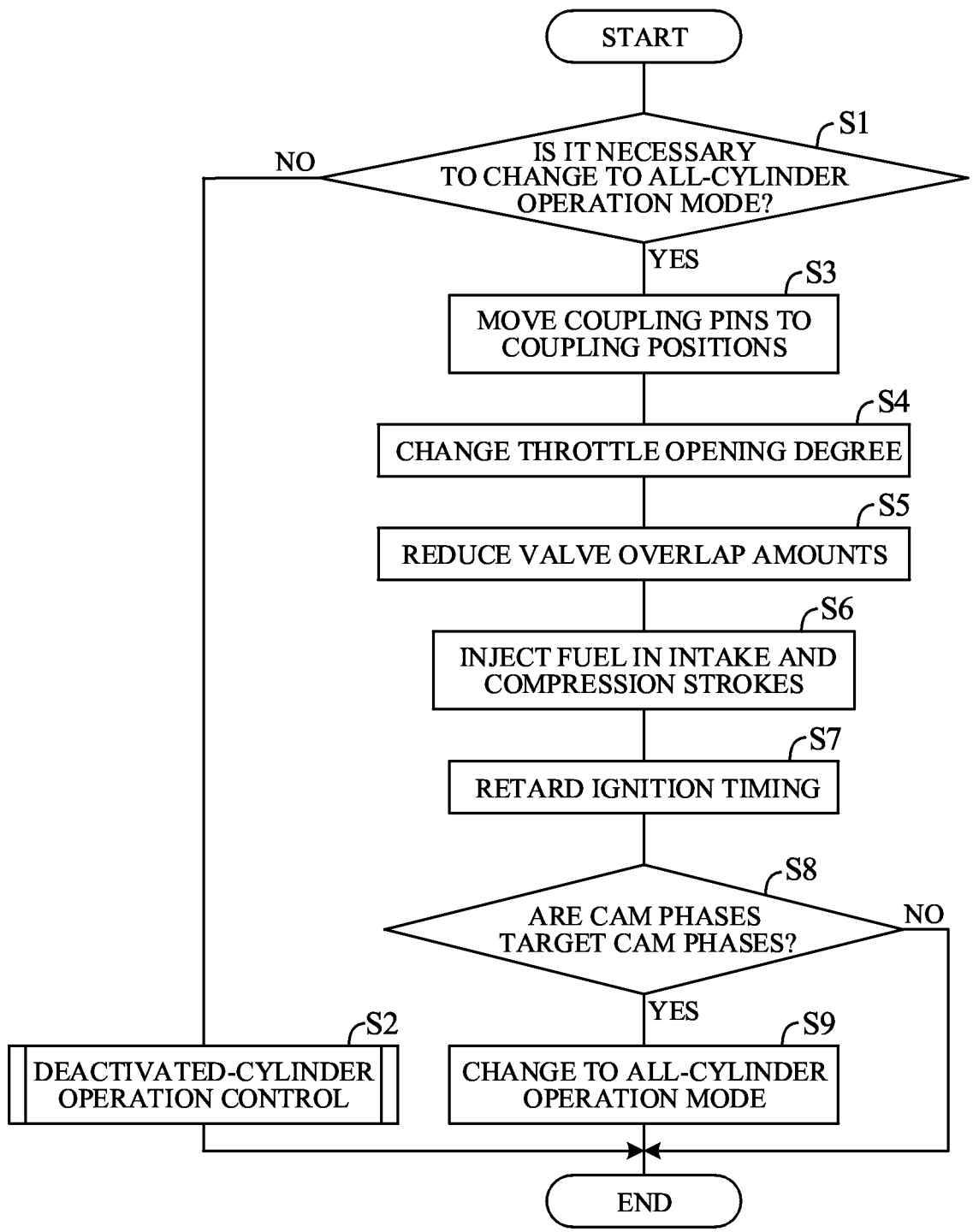
FIG. 4 is a flowchart showing an example of a process performed by a controller in FIG. 3.

FIG. 4 is a flowchart showing an example of a process performed by the controller 30 (mainly, the operation mode change unit 30D) in FIG. 3 in accordance with a predetermined program, that is, an example of a mode change process for changing from the deactivated-cylinder operation mode to the all-cylinder operation mode. The process shown in this flowchart is started during operation in the deactivated-cylinder operation mode and repeated in a predetermined cycle until the operation mode is completely changed to the all-cylinder operation mode.

First, in S1 (S: processing step), it is determined whether an instruction for changing to the all-cylinder operation mode is output by the operation mode instruction unit 30A. If the determination in S1 is NO, the process proceeds to S2, and the deactivated-cylinder operation control by the deactivated-cylinder operation control unit 30C is continued. On the other hand, if the determination in S1 is YES, the process proceeds to S3, and control signal is output to the cylinder deactivation actuator 42 to move the coupling pins of the cylinder deactivation mechanisms 23 and 24 to the coupling positions. Thus, the intake valves 15 and exhaust valves 16 of the deactivated cylinders #4 to #6 start open-close operations. Then, in S4, control signal is output to the throttle actuator 41 to change the throttle opening degree. For example, the throttle opening degree is reduced compared to that before an instruction for a change to the all-cylinder operation mode is output.

Next, in S5, control signal is output to the VTC actuator 43 of the non-deactivated cylinders #1 to #3 to reduce the valve overlap amounts to the reference overlap amount corresponding to the operation states of the engine 1. Specifically, the cam phases of the intake cam 21a and exhaust cam 22a are controlled to the target cam phases corresponding to the reference overlap amount. The valve overlap amounts of the deactivated cylinders #4 to #6 are also controlled to the reference overlap amount corresponding to the operation states.

Next, in S6, the injectors 18 of the non-deactivated cylinders #1 to #3 are controlled so as to inject the fuel, for example, once in the intake stroke and once in the compression stroke (injections of one stage in intake and one stage in compression) instead of injections of two stages in intake. By injecting the fuel in the compression stroke, stratified charge combustion can be caused near the spark plugs 17. Thus, even if the internal EGR gas remains in the combustion chambers 6, the combustion can be stabilized, resulting in prevention of a misfire. As for the deactivated cylinders #4 to #6, the injectors 18 are controlled so as to inject the fuel in two stages in intake. Instead of injecting the fuel in two stages in intake, the injectors 18 are controlled so as to inject the fuel in one stage in intake and one stage in compression, as is the case with the non-deactivated cylinders #1 to #3.

Next, in S7, control signals are output to the injectors 18 of the cylinders 1 to so that the ignition timing is retarded, that is, so that the ignition timing lags behind the deactivated-cylinder reference ignition timing, which is the ignition timing in the deactivated-cylinder operation mode before an instruction for a change to the all-cylinder operation mode is output. In this case, the amount of retard of the ignition timing is controlled so as to be great in the initial state immediately after the instruction for the change to the all-cylinder operation mode is output, and then gradually become smaller (be shifted to the advance side), and the ignition timing is finally controlled to the all-cylinder reference ignition timing in the all-cylinder operation mode. Retarding the ignition timing can reduce a torque shock caused by an increase in the engine torque when changing the operation mode from the deactivated-cylinder operation mode to the all-cylinder operation mode.

Then, in S8, it is determined whether the cam phases of the intake cams 21a corresponding to the intake valves 15 of the non-deactivated cylinders #1 to #3 and the cam phases of the exhaust cams 22a corresponding to the exhaust valves 16 are the respective target values (target cam phases), on the basis of signals from the cam-angle sensors 36 and 37. The reason is that the VTC actuator 43 operates by hydraulic pressure and even if the VTC actuator is driven in S5, the cam phases do not immediately become the target cam phases, that is, become the target cam phases after a delay.

If the determination in S8 is YES, the process proceeds to S9; if the determination is NO, the process skips S9. In S9, the operation mode is changed to the all-cylinder operation mode, and then the processing of changing the operation mode is ended. Subsequently, all-cylinder operation control is performed by the all-cylinder operation control unit 30B. The detailed explanation of a change of the operation mode from the all-cylinder operation mode to the deactivated-cylinder operation mode is omitted.

Figure 5A:
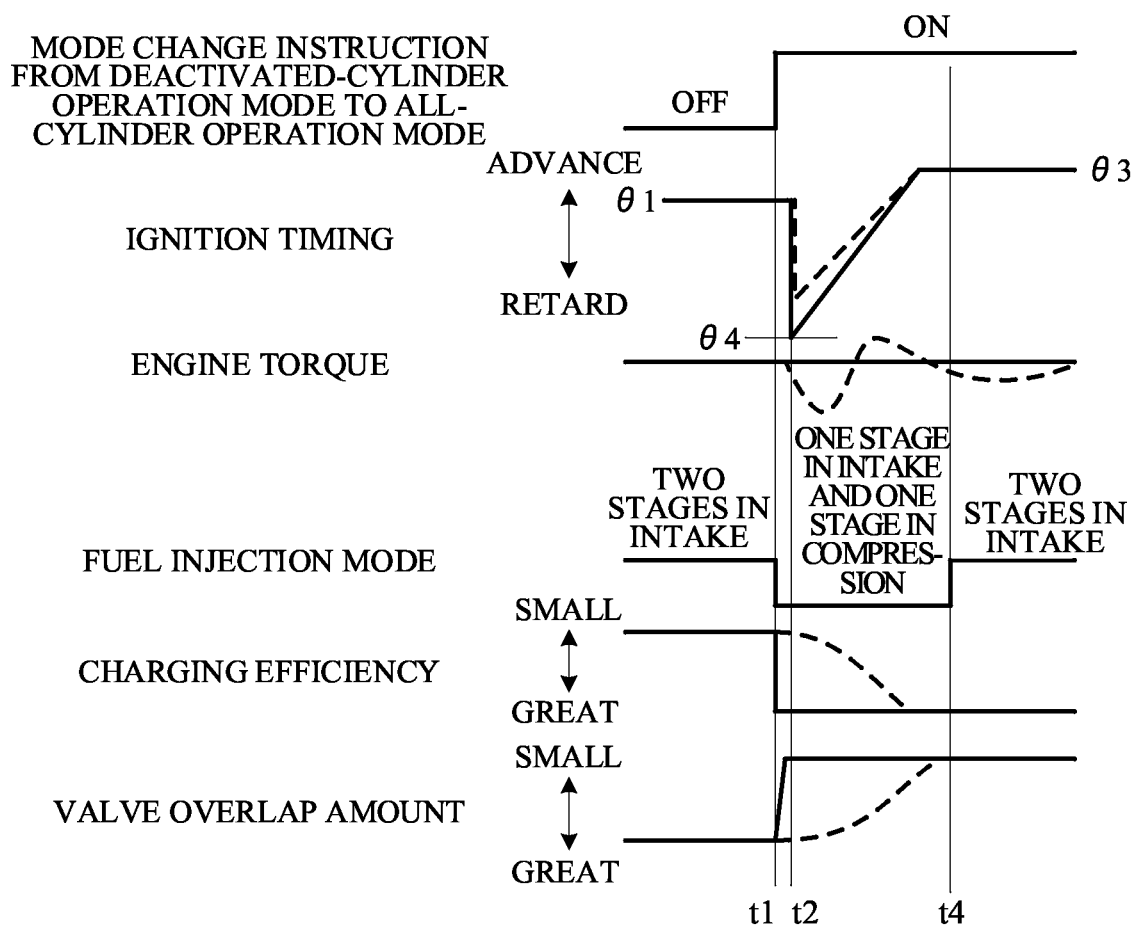
FIG. 5A is a time chart showing an example of an operation of a cylinder deactivation change apparatus according to an embodiment of the present invention.
Figure 5B:
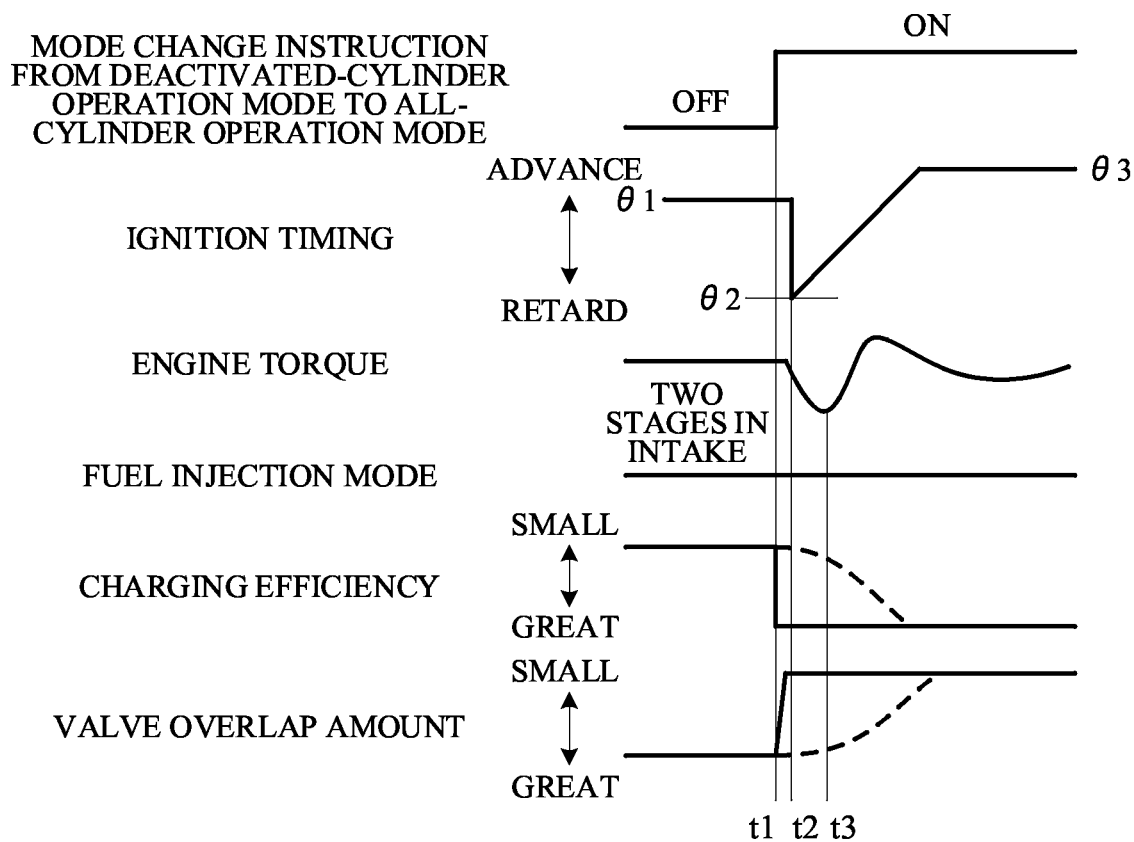
FIG. 5B is a time chart showing a comparative example of FIG. 5A.

The operation of the cylinder deactivation change apparatus 100 according to the present embodiment will be described more specifically. FIG. 5A is a time chart showing an example of the operation of the cylinder deactivation change apparatus 100 according to the present embodiment when changing the operation mode from the deactivated-cylinder operation mode to the all-cylinder operation mode. FIG. 5B is a time chart showing a comparative example of FIG. 5A. Here, it is assumed that the required torque is constant between before and after changing the operation mode.

Both FIGS. 5A and 5B show changes over time in an instruction (mode change instruction) for changing from the deactivated-cylinder operation mode to the all-cylinder operation mode, the ignition timing of the spark plug 17, the engine torque, the fuel injection mode when the fuel is injected from the injectors 18 of the non-deactivated cylinders #1 to #3, the charging efficiency of the non-deactivated cylinders #1 to #3, and the valve overlap amount of the non-deactivated cylinders #1 to #3. The present embodiment and comparative example differ from each other in the fuel injection mode when changing the operation mode. That is, in the present embodiment, the fuel is injected once in each of the intake stroke and compression stroke (one stage in intake and one stage in compression); in the comparative example, the fuel is injected twice in the intake stroke (two stages in intake), as in the deactivated-cylinder operation mode before the operation mode is changed.

First, the comparative example will be described. As shown in FIG. 5B, when an instruction for changing to the all-cylinder operation mode is output (the mode change instruction is turned on) at time t1 during operation in the deactivated-cylinder operation mode, the valve overlap amount is reduced. Thus, the amount of internal EGR gas is reduced, resulting in an increase in charging efficiency. In the diagram, solid lines represent command values of the valve overlap amount (cam phase) and charging efficiency, and dotted lines represent actually measured values or values estimated by calculation. As shown in the drawing, the valve overlap amount and the fuel efficiency change with delays as compared to the command values.

Next, at time t2, the ignition timing of the spark plug 17 is retarded compared to the deactivated-cylinder reference ignition timing θ1 in order to prevent an increase in engine torque. Time point t2, at which the ignition timing is retarded, may be the same as time point t1. The retard amount of the ignition timing is maximized (θ2) at time point t2 and gradually reduced with time. When the operation mode is completely changed to the all-cylinder operation mode, the ignition timing becomes the all-cylinder reference ignition timing θ3. Such control may destabilize the combustion state in the non-deactivated cylinders #1 to #3 and cause a misfire at time point t3, thereby rapidly reducing the engine torque.

On the other hand, in the present embodiment, as shown in FIG. 5A, the fuel is injected in the compression stroke (S6). That is, the fuel is injected in one stage in intake and one stage in compression from time point t1 until time point t4, at which the actually measured value or calculation-based estimated value of the valve overlap amount becomes the reference overlap amount. This allows for prevention of a misfire in the non-deactivated cylinders #1 to #3, as well as allows for keeping the engine torque constant between before and after changing the operation mode, unlike that of the comparative example (dotted line). In FIG. 5A, the retard amount of the ignition timing (ignition timing θ4) at time point t2 is greater than the retard amount (ignition timing θ2) of the comparative example as shown in dotted line.

The present embodiment can achieve advantages and effects such as the following:

(1) The cylinder deactivation change apparatus 100 is configured to change the operation mode between the all-cylinder operation mode in which both the non-deactivated cylinders #1 to #3 and deactivated cylinders #4 to #6 of the engine 1 are activated and the deactivated-cylinder operation mode in which the deactivated cylinders #4 to #6 are deactivated with the non-deactivated cylinders #1 to #3 activated. The cylinder deactivation change apparatus 100 includes the operation mode instruction unit 30A that determines whether it is necessary to change the operation mode needs and outputs an instruction for changing the operation mode, the injectors 18 that supply the fuel to the combustion chambers 6 (first combustion chambers) of the non-deactivated cylinders #1 to #3 and the combustion chambers 6 (second combustion chambers) of the deactivated cylinders #4 to #6, the spark plugs 17 that ignite the fuel-air mixture in the combustion chambers 6 of the non-deactivated cylinders #1 to #3 and the fuel-air mixture in the combustion chambers 6 of the deactivated cylinders #4 to #6, and the controller 30 that controls the injectors 18 and spark plugs 17 in accordance with the operation mode change result determined by the operation mode instruction unit 30A (FIGS. 2 and 3). If it is determined that it is necessary to change to the all-cylinder operation mode by the operation mode instruction unit 30A during operation in the deactivated-cylinder operation mode, the controller 30, in particular, the operation mode change unit 30D controls the spark plugs 17 and injectors 18 so as to retard the ignition timing compared to the deactivated-cylinder reference ignition timing θ1 before it is determined that it is necessary to change to the all-cylinder operation mode (θ1→4), and so that the fuel is supplied to the combustion chambers 6 of the non-deactivated cylinders #1 to #3 at least when the non-deactivated cylinders #1 to #3 are in the compression stroke (more specifically, in the intake stroke and compression stroke) (S6 and S7 in FIG. 4).

As seen above, the cylinder deactivation change apparatus 100 is configured to inject the fuel to the non-deactivated cylinders #1 to #3 in the compression stroke when changing the operation mode from the deactivated-cylinder operation mode to the all-cylinder operation mode and thus is able to reduce the possibility that the non-deactivated cylinders #1 to #3 may cause a misfire. More specifically, if the ignition timing is retarded in order to reduce the torque shock caused when changing the operation mode from the deactivated-cylinder operation mode to the all-cylinder operation mode, the combustion state may be destabilized, resulting in a misfire; however, by injecting the fuel in the compression stroke, stratified charge combustion can be caused near the spark plug 17. This allows for suppression of a misfire and prevention of a rapid reduction in the engine torque.

(2) The cylinder deactivation change apparatus 100 further includes the cam-phase change mechanisms 25 and 26 having a function of re-circulating the exhaust gas to the combustion chambers 6 of the non-deactivated cylinders #4 to #6 (FIG. 2). During operation in the deactivated-cylinder operation mode, the controller 30 controls the VTC actuator 43 of the cam-phase change mechanisms 25 and 26 so that the exhaust gas is recirculated to the combustion chambers 6 of the non-deactivated cylinders #1 to #3. Since such a configuration destabilizes the combustion state due to the internal EGR, further increasing the possibility of a misfire, it is more effective for a prevention of misfire to inject the fuel in the compression stroke, as is done in the present embodiment.

(3) If it is determined that it is necessary to change to the all-cylinder operation mode by the operation mode instruction unit 30A during operation in the deactivated-cylinder operation mode, the controller 30 controls the VTC actuator 43 so that the amounts of exhaust gas recirculated to the combustion chambers 6 of the non-deactivated cylinders #1 to (the amounts of internal EGR gas) are reduced (S5 in FIG. 4). Thus, when changing the operation mode from the deactivated-cylinder operation mode to the all-cylinder operation mode, the amounts of internal EGR gas are reduced, allowing the possibility of a misfire to be further reduced.

The above embodiment can be modified into various forms, and modifications will be described below. In the above embodiment, the V-6 engine 1 is used as an internal-combustion engine; however, as long as it includes deactivated cylinders (second cylinder), which are temporarily deactivated and non-deactivated cylinders (first cylinder), which are continuously activated without being deactivated, the internal-combustion engine may have any configuration with respect to the numbers, positions, or the like of the first cylinder and second cylinder. That is, while, in the above embodiment, the three non-deactivated cylinders #1 to #3 are used as first cylinders and the three deactivated cylinders #4 to #6 are used as second cylinders, the number of first cylinders may be less than or more than three and the number of second cylinders may also be less than or more than three.

While, in the above embodiment, the operation mode is changed between the all-cylinder operation mode in which both the non-deactivated cylinders #1 to #3 and deactivated cylinders #4 to #6 are activated and the deactivated-cylinder operation mode in which the deactivated cylinders #4 to #6 are deactivated with the non-deactivated cylinders #1 to #3 activated, the first mode and second mode need not be those described above. For example, assuming that the operation mode can be changed among a mode in which three of six cylinders are activated, a mode in which four of six cylinders are activated, and a mode in which the six cylinders are activated, a change from the three cylinder activation mode to the four cylinder activation mode may be regarded as a change from the second mode to the first mode, or a change from the four cylinder activation mode to the six cylinder activation mode may be regarded as a change from the second mode to the first mode. The operation mode may be changeable to another operation mode (third mode) different from the first and second modes as long as the operation mode is changed to at least the first mode and second mode. For example, the third mode may be a mode in which all cylinders are deactivated.

While, in the above embodiment, the operation mode instruction unit 30A determines whether the operation mode needs to be changed, in accordance with the operation states of the engine 1, a mode change determination unit is not limited to the above configuration. While, in the above embodiment, the injectors 18 supply the fuel to the combustion chambers 6 of the cylinders #1 to #6, fuel supply parts are not limited to the above configuration. While, in the above embodiment, the spark plugs 17 ignite the fuel-air mixture in the combustion chambers 6 of the cylinders #1 to #6, ignition parts are not limited to the above configuration.

In the above embodiment, the fuel injection mode is changed from two stages in intake to one stage in intake and one stage in compression when changing the operation mode from the deactivated-cylinder operation mode (second mode) to the all-cylinder operation mode (first mode); however, the injection frequency or injection timing in each operation mode need not be that described above as long as the fuel is injected at least in the compression stroke. For example, when it is determined that the operation mode needs to be changed from the second mode to the first mode, the fuel injection mode may be changed from two stages in intake to one stage in compression, or from one stage in intake to one stage in intake and one stage in compression, or from three stages in intake to one stage in intake and two stages in compression. The injection of the fuel in the compression stroke aims to realize stratified charge combustion in the non-deactivated cylinders (first cylinder). Accordingly, the controller 30 as a control unit is not limited to the above configuration as long as it controls the injector 18 so that when it is determined that the operation mode needs to be changed to the first mode during operation in the second mode, the fuel is supplied to the combustion chamber of the first cylinder (a first combustion chamber) in a manner that causes a stratified charge combustion in the first combustion chamber.

While, in the above embodiment, the exhaust gas is recirculated to the combustion chambers 6 of the non-deactivated cylinders #1 to #3 in the deactivated-cylinder operation mode by driving the VTC actuators 43 of the cam-phase change mechanisms 25 and 26, an exhaust gas recirculation part is not limited to the above configuration. For example, an exhaust passage and an intake passage may be connected through a piping so that the exhaust gas is recirculated through the piping. In this case, the exhaust gas to be recirculated may be cooled using a cooler. That is, external EGR may be used in place of internal EGR.

While, in the above embodiment, when it is determined that the operation mode needs to be changed to the all-cylinder operation mode, the valve overlap amount is reduced to the reference overlap amount for reducing the amount of exhaust gas recirculated to the combustion chambers 6 of the non-deactivated cylinders #1 to #3 and the predetermined operation of the VTC actuator 43 for reducing the valve overlap amount to the reference overlap amount is detected on the basis of signals from the cam-angle sensors 36 and 37, an operation detecting part is not limited to the above configuration. In the above embodiment, by processing in the controller 30, the fuel is supplied to the non-deactivated cylinders #1 to #3 in two stages in intake (a first timing) during operation in the deactivated-cylinder operation mode, the fuel is supplied to the non-deactivated cylinders #1 to #3 in one stage in intake and one stage in compression (a second timing) when it is determined that the operation mode needs to be changed to the all-cylinder operation mode, and the fuel is supplied to the non-deactivated cylinders #1 to #3 again in two stages in intake (the first timing) when the predetermined operation of the VTC actuator 43 is detected. However, the first and second timings may be any timings as long as the fuel injection frequency in the compression stroke at the second timing is higher than that at the first timing.

In the above embodiment, when it is determined that it is necessary to change the operation mode from the deactivated-cylinder operation mode to the all-cylinder operation mode, the ignition timing is changed from the deactivated-cylinder reference ignition timing θ1 (a first ignition timing) to the ignition timing θ4 (a second ignition timing) retarded in comparison with the ignition timing θ1 (FIG. 5A). However, the first and second ignition timings are not limited to the above configuration, as long as retarding the second ignition timing compared to the first ignition timing.

While, in the above embodiment, the cylinder deactivation mechanisms 23 and 24 configured to be able to couple the first rocker arms and second rocker arms through the coupling pins keep the intake valves 15 and exhaust valves 16 of the non-deactivated cylinders #4 to #6 closed in the deactivated-cylinder operation mode, the cylinder deactivation mechanisms need not have the above configuration. Assuming that the cylinder deactivation mechanism for intake and cylinder deactivation mechanism for exhaust have the same configuration, another example of the cylinder deactivation mechanism for intake will be described briefly. In the other example of the cylinder deactivation mechanism, a valve lifter that is pushed by rotation of an intake cam 21a is interposed between the upper end of a valve stem of an intake valve 15 (a rod-shaped portion extending upward from a lower-end valve head) and the intake cam 21a, and a slide pin that can be moved in a direction perpendicular to the pushing direction of the valve lifter is inserted in the valve lifter.

The slide pin is configured to be movable between a first position and a second position, for example, by hydraulic pressure corresponding to a change of a control valve that is changed in accordance with a command from the controller 30. When the slide pin is moved to the first position, the valve lifter and the valve stem of the intake valve 15 are integrally vertically moved through the slide pin; when the slide pin is moved to the second position, the valve stem of the intake valve 15 is moved vertically relative to the valve lifter. More specifically, when the slide pin is moved to the first position, the position of the valve stem with respect to a through hole that vertically penetrates the slide pin is shifted and thus the vertical movement of the valve lifter is transmitted to the valve stem through the slide pin; when the slide pin is moved to the second position, the positions of the through hole and valve stem match each other, allowing the valve stem to relatively move in the through hole and preventing the vertical movement of the valve lifter from being transmitted to the valve stem. The configuration of such a cylinder deactivation mechanism is described in, for example, Japanese Unexamined Patent Publication No. 2017-214876 or the like.

The invention can be also configured as a cylinder deactivation change method, configured to change an operation mode of an internal combustion engine including a first cylinder and a second cylinder, between a first mode in which the first cylinder and the second cylinder are activated and a second mode in which the second cylinder is deactivated while the first cylinder is activated.

The above embodiment can be combined as desired with one or more of the above modifications. The modifications can also be combined with one another.

According to the present invention, it is possible to reduce a possibility of misfire when part of cylinders is changed from a deactivated state to an activated state.

Above, while the present invention has been described with reference to the preferred embodiments thereof, it will be understood, by those skilled in the art, that various changes and modifications may be made thereto without departing from the scope of the appended claims.

What is claimed is:

1. A cylinder deactivation change apparatus, configured to change an operation mode of an internal combustion engine including a first cylinder and a second cylinder, between a first mode in which the first cylinder and the second cylinder are activated and a second mode in which the second cylinder is deactivated while the first cylinder is activated, the cylinder deactivation change apparatus comprising:
fuel supply parts configured to supply a fuel into a first combustion chamber formed in the first cylinder and a second combustion chamber formed in the second cylinder;
ignition parts configured to ignite a fuel-air mixture in the first combustion chamber and a fuel-air mixture in the second combustion chamber; and
an electronic control unit having a microprocessor and a memory, wherein
the microprocessor is configured to perform:

determining whether it is necessary to change the operation mode; and controlling the fuel supply parts so as to supply the fuel at a first ignition mode in which the fuel is supplied at least in a compression stroke or a second ignition mode in which the fuel is supplied in a stroke other than the compression stroke, and controlling the ignition parts so as to ignite the fuel-air mixture at a first ignition timing or a second ignition timing retarded in comparison with the first ignition timing, and wherein the microprocessor is further configured to perform the controlling including controlling the ignition parts so as to ignite at the first ignition timing in the second mode, and controlling the ignition parts so as to ignite at the second ignition timing when it is determined that it is necessary to change the operation mode from the second mode to the first mode.

2. The cylinder deactivation change apparatus according to claim 1, wherein the microprocessor is configured to perform the controlling including controlling the fuel supply parts so as to supply the fuel into the first combustion chamber at least in the compression stroke of the first cylinder, in the first ignition mode.

3. The cylinder deactivation change apparatus according to claim 2, wherein the microprocessor is configured to perform the controlling including controlling the fuel supply parts so as to supply the fuel into the first combustion chamber in an intake stroke of the first cylinder and so as not to supply the fuel into the first combustion chamber in the compression stroke of the first cylinder, in the second ignition mode.

4. The cylinder deactivation change apparatus according to claim 1, further comprising an exhaust gas recirculation part configured to recirculate an exhaust gas into the first combustion chamber, wherein the microprocessor is configured to perform the controlling further including controlling the exhaust gas recirculation part so as to recirculate the exhaust gas into the first combustion chamber in the second mode.

5. The cylinder deactivation change apparatus according to claim 4, wherein the microprocessor is configured to perform the controlling including controlling the exhaust gas recirculation part so as to decrease an amount of the exhaust gas into the first combustion chamber when it is determined that it is necessary to change the operation mode from the second mode to the first mode.

6. The cylinder deactivation change apparatus according to claim 5, further comprising an operation detecting part configured to detect a predetermined operation of the exhaust gas recirculation part to decrease the amount of the exhaust gas into the first combustion chamber, wherein the microprocessor is configured to perform the controlling including controlling the fuel supply part so as to supply the fuel into the first combustion chamber at the second ignition mode during operation in the second mode, and to supply the fuel into the first combustion chamber at a second timing the first ignition mode when it is determined that it is necessary to change the operation mode from the second mode to the first mode, and then, to supply the fuel into the first combustion chamber at the second ignition mode when the predetermined operation is detected by the operation detecting part.

7. A cylinder deactivation change apparatus, configured to change an operation mode of an internal combustion engine including a first cylinder and a second cylinder, between a first mode in which the first cylinder and the second cylinder are activated and a second mode in which the second cylinder is deactivated while the first cylinder is activated, the cylinder deactivation change apparatus comprising:

fuel supply parts configured to supply a fuel into a first combustion chamber formed in the first cylinder and a second combustion chamber formed in the second cylinder;

ignition parts configured to ignite a fuel-air mixture in the first combustion chamber and a fuel-air mixture in the second combustion chamber; and an electronic control unit having a microprocessor and a memory, wherein the microprocessor is configured to function as:

a mode change determination unit configured to determine whether it is necessary to change the operation mode; and a control unit configured to control the fuel supply parts so as to supply the fuel at a first ignition mode in which the fuel is supplied at least in a compression stroke or a second ignition mode in which the fuel is supplied in a stroke other than the compression stroke, and control the ignition parts so as to ignite the fuel-air mixture at a first ignition timing or a second ignition timing retarded in comparison with the first ignition timing, and wherein the control unit is configured to control the ignition parts so as to ignite at the first ignition timing in the second mode, and control the ignition parts so as to ignite at the second ignition timing when it is determined that it is necessary to change the operation mode from the second mode to the first mode by the mode change determination unit.

8. The cylinder deactivation change apparatus according to claim 7, wherein the control unit is configured to control the fuel supply parts so as to supply the fuel into the first combustion chamber at least in the compression stroke of the first cylinder, in the first ignition mode.

9. The cylinder deactivation change apparatus according to claim 8, wherein the control unit is configured to control the fuel supply parts so as to supply the fuel into the first combustion chamber in an intake stroke of the first cylinder and so as not to supply the fuel into the first combustion chamber in the compression stroke of the first cylinder, in the second ignition mode.

10. The cylinder deactivation change apparatus according to claim 7, further comprising an exhaust gas recirculation part configured to recirculate an exhaust gas into the first combustion chamber, wherein the control unit is configured to further control the exhaust gas recirculation part so as to recirculate the exhaust gas into the first combustion chamber in the second mode.

11. The cylinder deactivation change apparatus according to claim 10, wherein the control unit is configured to control the exhaust gas recirculation part so as to decrease an amount of the exhaust gas into the first combustion chamber when it is determined that it is necessary to change the operation mode from the second mode to the first mode by the mode change determination unit.

12. The cylinder deactivation change apparatus according to claim 11, further comprising
an operation detecting part configured to detect a predetermined operation of the exhaust gas recirculation part to decrease the amount of the exhaust gas into the first combustion chamber, wherein
the control unit is configured to control the fuel supply part so as to supply the fuel into the first combustion chamber at the second ignition mode during operation in the second mode, and to supply the fuel into the first combustion chamber at the first ignition mode when it is determined that it is necessary to change the operation mode from the second mode to the first mode by the mode change determination unit, and then, to supply the fuel into the first combustion chamber at the second ignition mode when the predetermined operation is detected by the operation detecting part.

13. A cylinder deactivation change method, configured to change an operation mode of an internal combustion engine including a first cylinder and a second cylinder, between a first mode in which the first cylinder and the second cylinder are activated and a second mode in which the second cylinder is deactivated while the first cylinder is activated,
the cylinder deactivation change method comprising:
supplying a fuel into a first combustion chamber formed in the first cylinder and a second combustion chamber formed in the second cylinder by fuel supply parts;
igniting a fuel-air mixture in the first combustion chamber and a fuel-air mixture in the second combustion chamber by ignition parts;
determining whether it is necessary to change the operation mode; and
controlling the fuel supply parts so as to supply the fuel at a first ignition mode in which the fuel is supplied at least in a compression stroke or a second ignition mode in which the fuel is supplied in a stroke other than the compression stroke, and controlling the ignition parts so as to ignite the fuel-air mixture at a first ignition timing or a second ignition timing retarded in comparison with the first ignition timing, wherein
the controlling includes controlling the ignition parts so as to ignite at the first ignition timing in the second mode, and controlling the ignition parts so as to ignite at the second ignition timing when it is determined that it is necessary to change the operation mode from the second mode to the first mode.

14. The cylinder deactivation change method according to claim 13, wherein
the controlling includes controlling the fuel supply parts so as to supply the fuel into the first combustion chamber at least in the compression stroke of the first cylinder, in the first ignition mode.

15. The cylinder deactivation change method according to claim 14, wherein
the controlling includes controlling the fuel supply parts so as to supply the fuel into the first combustion chamber in an intake stroke of the first cylinder and so as not to supply the fuel into the first combustion chamber in the compression stroke of the first cylinder, in the second ignition mode.

16. The cylinder deactivation change method according to claim 13, further comprising
recirculating an exhaust gas into the first combustion chamber by an exhaust gas recirculation part, wherein
the controlling further includes controlling the exhaust gas recirculation part so as to recirculate the exhaust gas into the first combustion chamber in the second mode.

17. The cylinder deactivation change method according to claim 16, wherein
the controlling includes controlling the exhaust gas recirculation part so as to decrease an amount of the exhaust gas into the first combustion chamber when it is determined that it is necessary to change the operation mode from the second mode to the first mode.

18. The cylinder deactivation change method according to claim 17, further comprising
detecting a predetermined operation of the exhaust gas recirculation part to decrease the amount of the exhaust gas into the first combustion chamber, wherein
the controlling includes controlling the fuel supply part so as to supply the fuel into the first combustion chamber at the second ignition mode during operation in the second mode, and to supply the fuel into the first combustion chamber at the first ignition mode when it is determined that it is necessary to change the operation mode from the second mode to the first mode, and then, to supply the fuel into the first combustion chamber at the second ignition mode when the predetermined operation is detected.

* * * * *